B. D. COPPAGE.
BEARING.
APPLICATION FILED DEC. 15, 1915.
1,235,116.
Patented July 31, 1917.
2 SHEETS—SHEET 2.
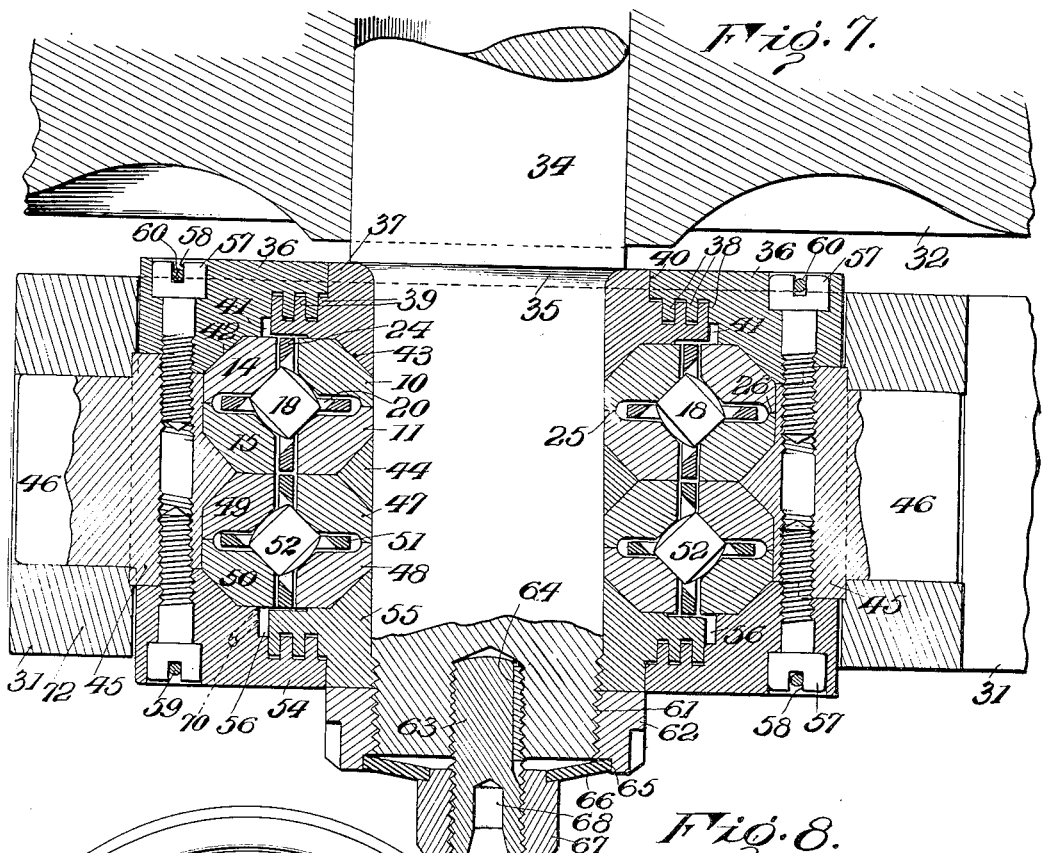
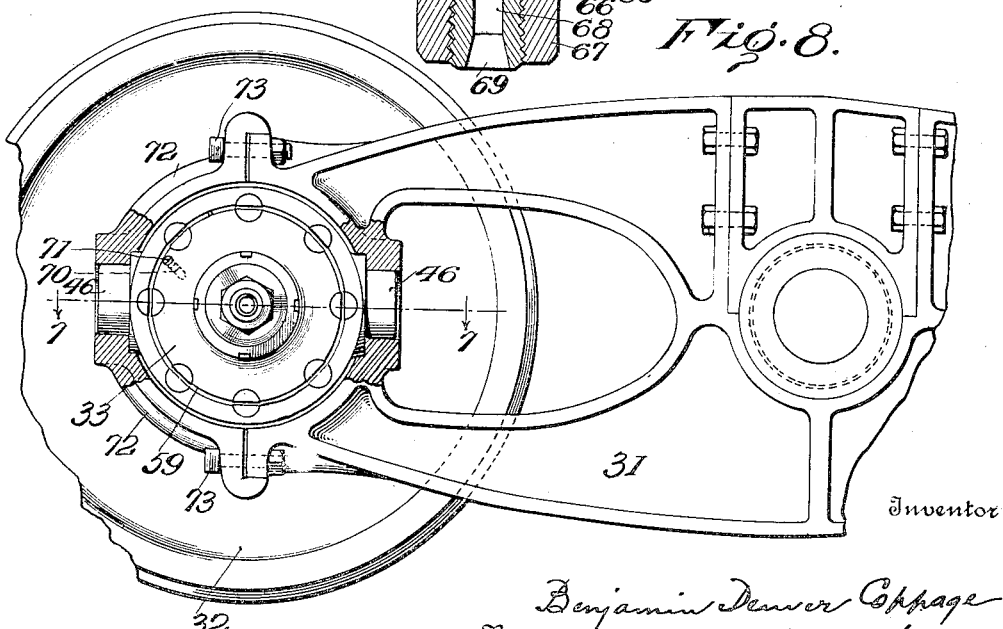
Inventor
Benjamin Denver Coppage
By Mauro, Cameron, Lewis & Massie
Attorneys

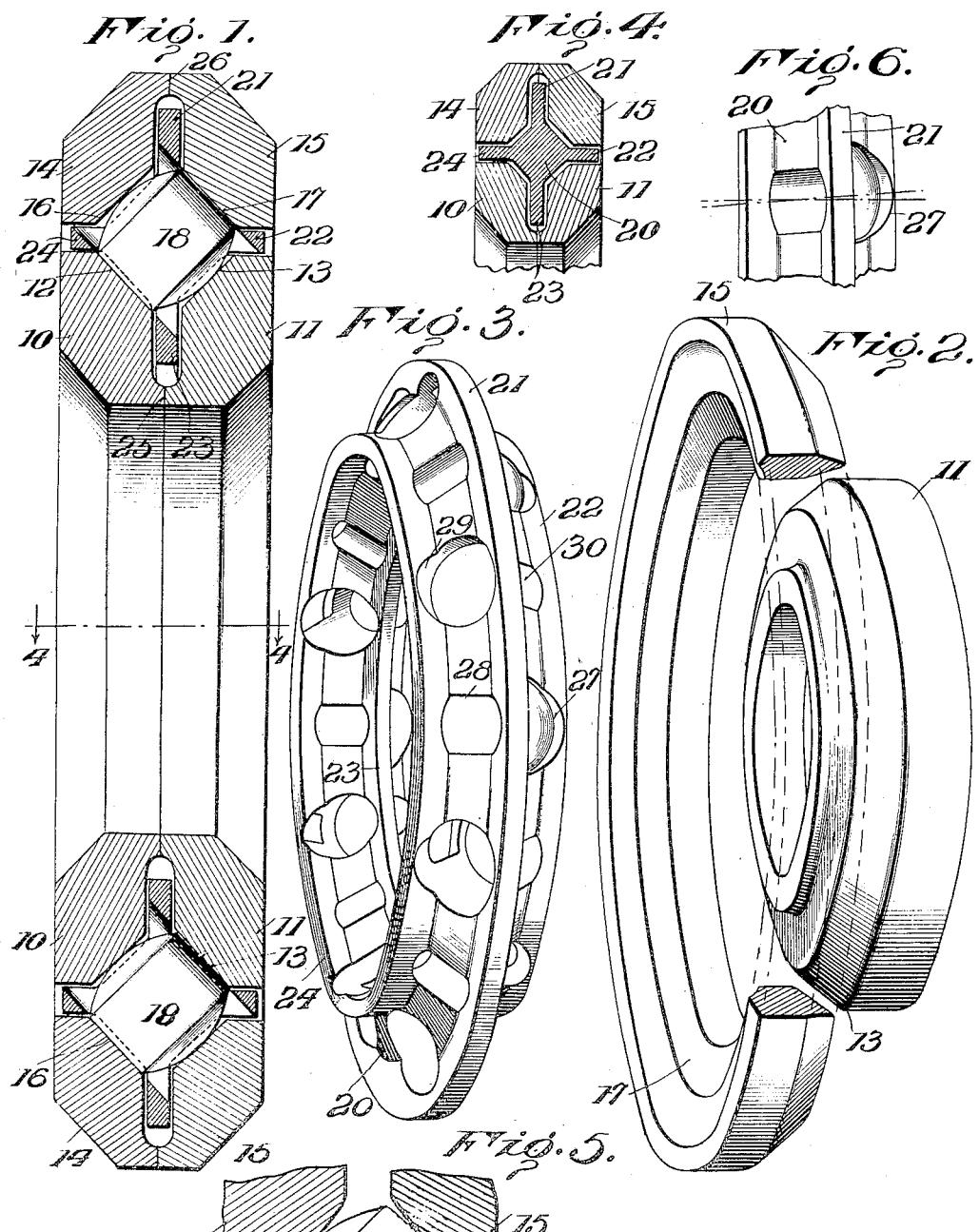
B. D. COPPAGE.
BEARING.
APPLICATION FILED DEC. 15, 1915.
1,235,116.
Patented July 31, 1917.
2 SHEETS—SHEET 1.

UNITED STATES PATENT OFFICE.

BENJAMIN DENVER COPPAGE, OF WILMINGTON, DELAWARE.

BEARING.

1,235,116.  Specification of Letters Patent.  Patented July 31, 1917.

Application filed December 15, 1915. Serial No. 66,975.

*To all whom it may concern:*

Be it known that I, BENJAMIN DENVER COPPAGE, a resident of Wilmington, Delaware, (whose post-office address is #14 Willard street, Wilmington, Delaware,) have invented a new and useful Improvement in Bearings, which invention is fully set forth in the following specification.

This invention relates to high-speed roller bearings capable of resisting or sustaining radial loads or thrust loads, or combinations of such loads. By the invention there is provided a reliable and thoroughly efficient high-speed roller bearing which is capable of carrying heavy loads, of withstanding repeated and severe thrust pressures, of resisting internal centrifugal forces without undue frictional loss or cramping, and especially capable of withstanding severe and repeated shocks in the direction of the radial or thrust loads or in both directions.

The invention relates not only to the composite parts of the bearing, such as the rollers, the bearing surfaces or races which are formed to coöperate with the rollers, and the cages or retaining rings for the rollers, and to combinations of such composite parts, but it also relates to the mountings and housings for the bearings which adapt them for use for railway and other heavy service.

One of the objects of the invention is to provide rollers for bearings of the sort referred to, which have their rolling surfaces crowned in a novel and improved way, and also to provide such crowned rollers in combination with other novel elements, such as bearing members which are also preferably crowned. Another object of the invention is to provide a roller bearing having its rollers and bearing members correlated to each other in a novel way, whereby both radial and thrust loads are effectively carried and whereby the centrifugal forces of the rollers themselves are taken care of without excessive friction. A further object of the invention is to provide in a roller bearing a novel cage construction having an improved coöperative relationship with the rollers and bearing members. A still further object of the invention is to provide novel connecting and inclosing parts in combination with a plurality of bearings, thus forming a structure adapted to support a truck, such as a railway truck, on an axle. A still further object of the invention is to provide an improved process whereby the before-mentioned crowning of the rollers or of the bearing members, or of both, can be easily and effectively accomplished. Still further objects will be apparent from a reading of the specification and claims.

Experience has shown that ball bearings cannot be successfully used for heavy duty, as the two or four points of contact provided by such bearings do not afford sufficient bearing surface to carry the loads. As the result of the necessarily high concentration of pressure on the very small areas of bearing surface, breakage of balls is very frequent.

Experience has also shown that roller bearings of the sorts heretofore known cannot be successfully used for heavy duty, especially when it is required that both thrust and radial loads shall be carried. It is known that the friction resulting from various arrangements of rollers heretofore proposed to carry radial and thrust loads has been excessively large. For instance, it has been proposed in previous patents to use two oppositely inclined separated sets of rollers, in one instance the rollers being conical and coöperating with conical bearing surfaces, in another instance the rollers having highly crowned rolling surfaces and coöperating with conical bearing surfaces, and in still another instance the rollers having highly crowned rolling surfaces and coöperating with bearing surfaces grooved to fit the roller surfaces. It has also been proposed to mount oppositely inclined rollers in one circumferential series, in one instance the rollers being highly crowned and in another instance conical. Another proposal has been to use groups of narrow disks mounted on inclined pins, the same forming composite rollers which are held in a cage and coöperate with conical bearing surfaces arranged in different ways. Composite rollers such as last mentioned are subject to excessive frictional resistance in themselves between the disks, and there is also excessive friction between the disks and the cage. Furthermore, after being in operation, the disks of such rollers become canted in various ways, excessive wear and chipping resulting. As the result of the excessive wear, the periphery of each roller becomes transversely curved and therefore contacts with each race at one point only, thus making the contacting area insufficient to do the work without still greater friction and still more chipping.

In the bearings heretofore proposed, it has been observed that one of the more important objections is that the pressure cannot be distributed with certainty over the entire widths of the rollers and races. Furthermore, when cylindrical rollers are placed between conical bearing surfaces, there is relative slipping at the edges of the rollers between the roller surfaces and the race surfaces, this slipping resulting in excessive friction and wear, especially when the pressure is great. Furthermore, in bearings heretofore proposed, no adequate provision has been made for counteracting and resisting the tendency of the rollers to move outward by centrifugal force, and the result has been that centrifugal force has caused pressure at undesired points with resultant excessive wear.

Preferably, in a bearing constructed in accordance with the present invention, there is a minute crowning of the bearing surfaces of the rollers or of the races or of both, the rollers being preferably substantially cylindrical. The crowning is so related to the elasticity of the rollers and races that, upon the application of normal pressure, the parts are sufficiently distorted to permit contact substantially from edge to edge, the pressure at and near the edges being relatively small to prevent chipping or cracking of the rollers. When substantially conical bearing surfaces are used, this minute crowning not only prevents excessive pressure at the edges of the rollers, but also, as the result of the reduced pressure at the edges, causes less friction at these portions where relative slipping occurs, and consequently less wear results.

The invention may be mechanically embodied in any of a number of ways, and in the accompanying drawings I have shown one embodiment; but it is to be understood that the embodiment shown is for illustrative purposes only and is not intended to define or limit the scope of the invention, the appended claims being relied upon for that purpose.

Of the drawings—

Figure 1 is a sectional view of a roller bearing embodying the invention;

Fig. 2 is a perspective view showing an inner and an outer bearing member or ring;

Fig. 3 is a perspective view of the cage or retaining ring in which the rollers are mounted;

Fig. 4 is a sectional view taken along the line 4—4 of Fig. 1;

Fig. 5 is a diagrammatic view illustrating in an exaggerated way the crowning of the surfaces of the rollers and races;

Fig. 6 is a fragmentary view of the cage, similar to the central part of Fig. 3, but illustrating in an exaggerated way the inclination of the roller compartments which obviates the friction otherwise due to centrifugal force;

Fig. 7 is a horizontal sectional view, taken along the line 7—7 of Fig. 8, showing two of the bearings as illustrated in Figs. 1 to 6, combined with other elements for supporting a railway truck on its axle;

Fig. 8 is an elevation (with parts broken away and shown in section) of a part of a railway truck having the bearing structure shown in Fig. 7.

The bearing comprises two relatively movable bearing members having oppositely disposed bearing races or surfaces thereon. In the preferred construction, as shown in the drawings, especially Fig. 1, inner and outer relatively rotatable annular bearing members are provided, these being arranged concentrically with each other and concentrically with a main axis of rotation. With an annular bearing as shown, at least one of these members must be formed in two parts, and preferably both of them are so formed. As illustrated, the inner bearing member comprises two separable rings 10 and 11, contacting or substantially contacting at 25, and respectively having bearing surfaces 12 and 13 arranged at an angle of preferably 90° to each other, and of preferably 45° to the main axis of rotation. The outer bearing member comprises two separable bearing rings 14 and 15, contacting or substantially contacting at 26, and respectively having bearing surfaces 16 and 17. These surfaces are at an angle of preferably 90° to each other, and of preferably 45° to the main axis of rotation, and are preferably respectively parallel to the surfaces 13 and 12. It will be seen that these four bearing surfaces substantially bound an annular roller space which is quadrilateral, and preferably rectangular or square, in cross section.

When necessary in the final assembling and mounting of the bearing, small annular shims of metal or paper may be inserted between the surfaces at 25 and 26 to properly correlate the bearing surfaces. Later, if required, the shims can be removed to compensate for wear.

Positioned in the annular roller space above referred to are rollers, there preferably being two sets of oppositely inclined rollers 18, the rollers of one set contacting with the bearing surfaces 12 and 17, and the rollers of the other set contacting with the bearing surfaces 13 and 16. Sufficient freedom is permitted to allow the introduction of a suitable lubricant. Preferably the rollers of the two sets are arranged alternately in a criss-cross manner, the axis of rotation of each roller being at an angle to the like axis of the next adjacent roller.

In the preferred form of the invention as illustrated, each roller is substantially cylindrical in form. All the rollers of one set are of the same diameter, and all the rollers of the other set are of the same diameter; and preferably all of the rollers of both sets are of the same diameter. Each roller preferably has a length approximately equal to the diameter of the rollers of the other set, but not exceeding it, and each roller of one set is adapted to contact at its ends with the bearing surfaces with which the rollers of the other set contact at their sides. When the rollers are all of the same diameter as shown, they all have the same length. To reduce the area of contact between the ends of the rollers and the adjacent bearing surfaces, the ends are preferably domed as indicated in the drawings, although the shape of the domed ends can be varied somewhat from that shown.

It will be understood that so far as concerns certain features of the invention now to be described, the construction and relative arrangement of the rollers and bearing members may be varied widely from the form illustrated, this form, however, being preferable for reasons that will be fully set forth. As will clearly appear from an inspection of Fig. 5, a relative crowning exists between the contacting side surfaces of the rollers and the race surfaces of the bearing members. As shown, both the side surfaces of the rollers and the race surfaces are crowned, but it will be understood that the crowning of both of these surfaces is not essential so far as the broadest aspects of my invention are concerned. The crowning of the rollers provides them with double-curved cylindroidal bearing surfaces which are curved circumferentially and also transversely to the circumferential curve, and when annular bearing members are used their bearing surfaces are also double-curved, being curved circumferentially and also transversely to the circumferential curve. The crowning of the parts is shown in greatly exaggerated form in Fig. 5, in order that it may be easily observable, but it is to be understood that actually the crowning is very minute, being so small as to escape casual observation. The extent of crowning is so related to the elasticity of the rollers and the elasticity of the bearing members that the said parts will sufficiently distort or deflect under a normal bearing load to cause the relative crowning to be overcome. When under no load, the edges of the rollers and races are out of contact, as shown in Fig. 5, but when under a normal load, the deflection or distortion is sufficient to cause contact substantially from edge to edge. It will be obvious that, under these conditions, the pressure at the centers of the rollers and races will be relatively great and that this pressure will decrease toward the edges, the pressure at the extreme edges theoretically being zero. It will be seen that, by means of the minute crowning described, there is provided a relatively wide zone or belt of bearing area which could not be secured if the relative crowning between the rollers and the races were so great as to be incapable of being overcome by distortion under pressure. At the same time, the minute crowning prevents any excessive pressures at the edges of the rollers, which excessive pressures would chip or crack the rollers and ruin the bearing.

Under normal conditions the several coöperating roller and race surfaces are separated by thin films of lubricating oil. If the crowning were materially greater than that which is provided, the high pressure at the center of the bearing surfaces would be liable to cause the surfaces to break through the lubricant film at the center, thus causing friction and wear; and if the crowning were omitted, the high pressure at the edges of the bearing surfaces would be liable to cause the surfaces to break through the lubricant film at the edges, thus causing friction and wear. The whole range of unit load or unit pressure will be within the film tension or viscosity factor or bearing value of the lubricant used.

With bearing surfaces which are of conoidal form, there are differences of speed at parts of the surfaces at different radial distances from the axis, thus causing relative slip between the said surfaces and the cylindroidal rollers, the surfaces of which travel at the same rolling speed throughout. By reason of the fact that the true rolling is at the central zone, there must be a slipping between the surfaces as the distances to the edges of the rollers increase from the central zone; and by reason of the decrease of pressures over these distances, the frictional loss is materially reduced. In other words, the unit of load per unit of area will be reduced from the central zone to each edge of each roller, thus decreasing the frictional loss due to slip. Such distribution of the pressures prevents high pressure from being directed against the edges of the rollers and causing a chipping thereof.

The minute crowning of the rollers or of the bearing surfaces of the bearing members can be effected in any desired way so far as the structural features of the invention are concerned, but the invention also comprises a novel process in accordance with which the crowning is preferably effected. In accordance with this novel process, the rollers are initially made with their rolling surfaces free from transverse curvature, preferably being exactly cylindrical. The rollers thus formed are placed between two surfaces having relative movement slower at the portions which contact with one edge of the roller, and faster at the portions which contact with the other edge of the roller, than the rolling speeds of the respectively adjacent parts of the roller surface. Preferably the surfaces between which the rollers are placed are the same bearing surfaces with which the rollers are to engage in the finished bearing, these bearing surfaces also being initially made free from transverse curvature, preferably being exactly conical. In fact, with a bearing such as I have illustrated, I prefer to assemble all four bearing rings and all of the rollers in the relative positions that they will occupy in the finished bearing. To the parts thus assembled, there is supplied very finely divided abrasive material, preferably mixed with a suitable lubricant, and the parts are operated under light loads and at high speeds, relative slip taking place at the edges of the several surfaces, and the extent of slip gradually decreasing toward the center where it is zero. The relative slip causes the abrasive material to effect a grinding action which varies from the edges of the surfaces toward the centers thereof, thus causing a minute crowning of the roller surfaces and of the annular bearing surfaces. This crowning action is continued until the surfaces are crowned to such an extent that, under the normal working load, the deflection or distortion of the rollers and bearing members will overcome the relative crowning and permit the rollers to contact with the annular surfaces substantially from edge to edge in the way already described. Then the abrasive material is removed.

Preferably there is provided a retaining ring or cage 20 for the rollers, the several bearing rings 10, 11, 14 and 15 being so formed as to provide annular spaces to receive the parts of the cage. The cage is preferably cruciform in cross section with annular projections 21, 22, 23 and 24. The part of the cage between the annular projections 21 and 22 will be known as the outer right recess, and the part between the annular projections 21 and 24 as the outer left recess. The compartment 27, by way of example, as shown in Fig. 3, extends from the outer right recess, and a portion of the cylindroidal surface of a roller introduced therein is shown at 28. The adjacent compartment 29 as shown extends from the outer left recess, and a portion of the cylindroidal surface of a roller introduced therein is shown in the upper right recess at 30. The same arrangement of the compartments is continued around the circumference of the cage. The axis of each compartment forms an angle, preferably 90°, with the angle of the axis of the next adjacent compartment. Preferably, these compartments are formed by drilling, and they extend entirely through the cage. The compartments are of such a diameter as to permit them to receive the rollers with small working clearances, and their diameters are so related to the cross-sectional form and dimensions of the cage that the sides of the rollers project through openings 28 and 30 to engage with the corresponding bearing surfaces 12, 13, 16 and 17. It will be observed that the form and construction of the cage is such that the rollers can be inserted endwise, or in directions parallel to their axes, and with the roller compartments extending entirely through the cage, as shown, the rollers can be inserted from either end as may be convenient.

It will be observed that, when the bearing is rotated at high speed, there will be a tendency for the rollers to move outward under the influence of centrifugal force into endwise engagement with the surfaces 16 and 17. In order to partly or entirely overcome this tendency of the rollers to move outward, it is preferred to incline the compartments 27 and 29 slightly with respect to their true rolling positions, as indicated in greatly exaggerated form in Fig. 6. The effect of this slight inclining of the compartments is to cant the rollers out of the positions that they would otherwise have, with their axes perpendicular to their circumferential path. The direction of inclination is so related to the direction of rotation that the rollers tend to move inward, thus bringing their inner ends into contact with the bearing surfaces 12 and 13. The canting of the rollers is such that, at normal rotative speed, the tendency of the rollers to move inward because of the canting will practically counterbalance or offset their tendency to move outward because of centrifugal force. Under normal conditions, therefore, the rollers will exert little or no endwise pressure against any bearing surface. At speeds below normal a slight endwise pressure may be exerted against the inner bearing surfaces, and at speeds above normal a slight endwise pressure may be exerted against the outer bearing surfaces, but in either case the pressure will not be sufficient to cause undue friction.

Figs. 7 and 8 show two bearings incorporated in a journal for railway cars. In this construction, 31 is a truck frame, 32 is a truck wheel, and 34 is an axle on which the wheel is mounted, the axle being shouldered at 35. A ring 36, preferably of cast-steel, surrounds the axle 34, preferably being the first element put in place when the journal is assembled on the axle; and a ring 37, preferably made of phosphor-bronze, fits tightly around the axle 34 and against the shoulder 35. The rings 36 and 37 preferably have respectively a plurality of annular flanges 38 and 39 which interengage with each other, and the ring 36 has a working fit with the ring 37 at the surfaces 40. Small annular compartments are formed at the ends of the interengaging flanges, and a large annular compartment is formed between the two rings at 41. The rings 36 and 37 preferably have beveled portions 42 and 43. The bearing members 10 and 14, which are correspondingly beveled, are placed in position against the surfaces 42 and 43, the bearing member 10 closely fitting the axle, although it is not essential that it should touch the axle. The cage 20 is then placed in position, the annular projection 24 extending between the members 10 and 14. Two of the rollers are shown at 18 and some or all of them may be introduced into the cage before it is put in place; or, if preferred, the rollers can be put in after the cage is in place, as each roller compartment has an exposed end open. The other bearing members 11 and 15 are introduced into positions concentric with one another and against the rollers and against members 10 and 14 at 25 and 26 or the shims therebetween. While the bearing can be assembled in place in the way described, it will be understood that, if preferred, it may be assembled apart from the axle and then moved bodily into place. It will be observed that the bearing members, constructed in four separate sections as shown, can be assembled in any desired order, to properly coöperate with the other elements with which they are combined. In the present construction, as already described, the rings 10 and 14 are preferably put in place first, but for other constructions any other two rings can be put in place first, as may be necessary.

An annular ring 44 having beveled outer edges fits the axle 34 and is placed against the bearing member 11. A ring 45 having trunnions 46, 46, is placed against the outer surfaces of the bearing members 14 and 15. This ring 45 has an inward projecting portion, the sides of which are beveled to fit the beveled portions of the outer bearing members. Bearing members 47, 48, 49 and 50, having a cage 51 with a plurality of rollers, two of which are shown at 52, are introduced into position as shown, the members 47 and 49 respectively engaging the members 11 and 15 and the rings 44 and 45. The second set of bearing members and rollers is a duplicate of the first set, and is assembled on the axle in the same manner. Rings 54 and 55, which are similar to rings 36 and 37, are placed against the bearing members 48 and 50, and these rings preferably have projecting flanges which interengage each other, leaving annular compartments at the ends of the projecting flanges and forming a large annular compartment 56 corresponding to compartment 41.

Suitable means are provided for holding in place the several parts already described, and preferably these means are such as to permanently close the journal, making it impossible for unauthorized persons to have access thereto. In the construction shown, the rings 36 and 54 are held in contact with the ring 45 and against the bearing members 14 and 50 by machine-screws 57 which force these rings into position. The head of each machine-screw is slotted, as shown at 58, and wires 59 and 60 are introduced into these slots and annular slots in the rings 36 and 54 to maintain the machine-screws in correct position. The throats of the slots of the machine-screws are burred after the wires have been introduced therein to prevent said wires from working out. Also, in the construction shown, the ring 37 is held against the shoulder 35, and the inner bearing members 10, 11, 47 and 48 are forced toward the ring 37 by pressure applied to ring 55. It will be seen that the several contacting beveled surfaces coöperate to secure firm engagement between each bearing ring and its supporting element, each ring being definitely and positively held in a position concentric with the axle. It is not necessary that the inner bearing members 10, 11, 47 and 48 contact with the axle 34.

The end of the axle 34 has preferably a screw-threaded portion 61 (preferably right-handed) and a nut 62 is screwed thereon into contact with the inner ring 55. For holding the nut 62 in place, the following structure is preferably provided: A member 63 oppositely screw-threaded to the nut 62 (preferably left-handed) is screwed into a similarly threaded aperture in the end of the shaft 34 as shown. This member has a slot 64 therein which is similar to a keyway; but the threaded portion of the axle contacting with member 63 is not cut away. Preferably, after the member 63 has been screwed into position, a hard lubricant containing a quantity of some abrasive material is forced into the slot 64. Upon movement of the member 63, the abrasive works into the threads and cuts into them, and acts to prevent continued movement, finally locking the member 63 rigidly in place. The nut 62 is cut away at 65 to allow the introduction of a cone-shaped metal washer 66. A nut 67 is screwed onto the member 63 and forces the washer 66 against the nut 62 and toward the end of the shaft 34, thereby locking the nut 62 against movement. The end of the member 63 is preferably drilled for a short distance, as shown at 68, and after the nut 67 has been screwed into position, the end of the member 63 is expanded, as shown at 69, thereby making it impossible for the nut 67 to unscrew. Inasmuch as the nut 62 and the member 63 are oppositely threaded, it is impossible for them to turn together relatively to the axle, even if the member 63 were to become loose. Such a check and locking arrangement prevents any accidents due to the bearing working apart, or any of its parts moving out of assembled position.

A suitable lubricant is forced into the bearing 33 through a hole 70, which is normally closed by a plug 71 (Fig. 8). The lubricant is forced into the annular compartment 56 and from there into the bearing members proper. When the bearing is run at high speed, there is a tendency to force the lubricant away from the moving parts. By reason of the positions of the interengaging parts 38 and 39 on the members 36, 37, 54 and 55, it is impossible for the lubricant pressure to increase to such a point that the lubricant will be forced out. When the rings 37 and 55, which rotate with the axle 34, move relatively to the rings 36 and 54, an action similar to that of a rotary pump takes place in the interengaging parts and any lubricant in the small annular compartments is forced into the large annular compartments 41 and 56. Pressures created in the bearings tend to force the lubricant out through the large annular compartments 41 and 56, but the rotary pump action of the rings prevents such outward flow of the lubricant. Should the speed of the bearing increase, the outward or centrifugal pressure of the lubricant increases, but at the same time the pressure produced by reason of the pump action of the members 37 and 55 increases and overcomes the excessive pressure of the lubricant.

One of the trunnions 46 of the ring 45 engages a suitable aperture in the frame 31 as shown, and a cap 72 fits over the other trunnion and into position against the frame 31 where it is held by bolts 73. By reason of the trunnion mounting of the bearing, it is possible for the wheels of the car-truck to set at varying angles to the frame without creating excessive concentrations of pressures upon any one particular roller, and for this reason the rollers do not become cracked or broken. This breaking and cracking has been one of the drawbacks when roller bearings have been introduced into apparatus where heavy duty is required. Such a mounting as described allows each roller to bear its share of the load, irrespective of the positions of the wheels of the truck due to unlevel road-beds.

While for the purpose of illustration one expression of the inventive idea has been shown and described in detail for the purpose of illustration, it is to be understood that the invention is not limited to this construction, but that the inventive idea is susceptible of various mechanical expressions within the limits of the appended claims.

What is claimed is:

1. A bearing roller having its rolling surface minutely crowned to cause the edge portions thereof when free from load to be out of contact with the race surfaces with which the central portion contacts, the extent of crowning being so related to the elasticity of the roller that the distortion under normal load causes the roller surface to contact substantially from edge to edge with the race surfaces.

2. A bearing comprising two relatively movable members having oppositely disposed bearing surfaces, and a plurality of rollers movable between said surfaces and contacting therewith at the central parts of the roller surfaces and not at the edges thereof when the bearing is free from pressure and contacting therewith substantially from edge to edge when the bearing is under normal pressure.

3. In a bearing, an inner bearing member having a bearing surface, an outer bearing member having a like bearing surface opposed to the first said surface, and a plurality of rollers having bearing surfaces contacting with the aforesaid bearing surfaces in a single narrow circumferential belt when said bearing is free from pressure and contacting with said surfaces in a belt substantially the width of said surfaces when under normal pressure.

4. A bearing comprising two relatively movable races having oppositely disposed bearing surfaces, and a plurality of rollers having bearing surfaces contacting with each of said race surfaces, one surface of each pair of contacting surfaces being minutely crowned thus causing the edge portions of the roller surfaces to be out of contact with the race surfaces when free from load, the extent of crowning being so related to the elasticity of the said rollers and races that the distortion under normal load causes the roller surfaces to contact substantially from edge to edge with the race surfaces.

5. In a bearing, a rotatable shaft, concentric rings associated with said shaft and provided with bearing surfaces and rollers having minutely crowned surfaces rotatable between said bearing surfaces and contacting therewith at the centers only when free from load and contacting substantially the full width of said crowned surfaces under normal load thereby effecting greater pressures at the central portions of said crowned surfaces than at the ends thereof.

6. In a bearing, a rotatable shaft, concentric rings associated with said shaft and provided with bearing surfaces at angles to the said rotatable shaft, and minutely crowned rollers rotatable between said surfaces and contacting therewith at the centers only when free from load and substantially the full width of said surfaces under normal loads, with a continuous decrease of pressure from the central portions of the crowned surfaces outward.

7. In a bearing, a rotating shaft, concentric rings associated therewith and provided with bearing surfaces at angles to said rotating shaft, and cylindroidal rollers rotatable between said bearing surfaces and arranged in a criss-cross manner between them and having their lengths substantially equal to their diameters.

8. A bearing comprising two relatively rotatable members each having two annular bearing surfaces at right angles to each other, the four surfaces substantially bounding an annular roller space rectangular in cross section, substantially cylindrical rollers in the said space contacting with two opposite bearing surfaces, and substantially cylindrical rollers in the said space contacting with the other two opposite bearing surfaces, each roller of each set having a length approximating but not exceeding the diameters of the rollers of the other set whereby each roller may have end contact with opposed bearing surfaces.

9. A bearing comprising two relatively rotatable members each having two annular bearing surfaces at right angles to each other, the four surfaces substantially bounding an annular roller space rectangular in cross section, substantially cylindrical rollers in the said space contacting with two opposite bearing surfaces, and substantially cylindrical rollers in the said space contacting with the other two opposite bearing surfaces, each roller of each set being domed at both ends and having a length approximating but not exceeding the diameter of the rollers of the other set.

10. In a bearing, the combination of members provided with inner and outer bearing surfaces, and two sets of rollers rotatable between said surfaces, one set being disposed crosswise to the other set and each of the said rollers having both ends domed for contacting with the said bearing surfaces.

11. In a bearing, the combination of members provided with inner and outer bearing surfaces, and two sets of minutely crowned rollers rotatable between said surfaces, one set being disposed crosswise to the other set and each of the said rollers having both ends domed for contacting with the said bearing surfaces.

12. A bearing comprising two relatively rotatable members each having two annular bearing surfaces at right angles to each other, the four surfaces substantially bounding an annular roller space square in cross section, and substantially cylindrical rollers of equal diameters in the said space contacting respectively with each two opposite bearing surfaces, each of the rollers having both ends domed and each having a length approximating but not exceeding its diameter.

13. A bearing comprising rotatable and non-rotatable members each having two annular bearing surfaces at angles to each other, and substantially cylindrical rollers between each rotatable surface and the opposite non-rotatable surface, each annular surface and the rolling surfaces of the corresponding rollers being of approximately the same width and normally in contact substantially from edge to edge.

14. A bearing comprising rotatable and non-rotatable members each having two annular surfaces at angles to each other, the four surfaces substantially bounding an annular roller space quadrilateral in cross section, and rollers in the said space between each rotatable surface and the opposite non-rotatable surface, each annular surface and the rolling surfaces of the corresponding rollers being of approximately the same width and normally in contact substantially from edge to edge.

15. A bearing comprising rotatable and non-rotatable members each having two annular surfaces at angles to each other, the four surfaces substantially bounding an annular roller space square in cross section, and substantially cylindrical rollers in the said space between each rotatable surface and the opposite non-rotatable surface, each annular surface and the rolling surfaces of the corresponding rollers being of approximately the same width and normally in contact substantially from edge to edge.

16. In a bearing, the combination of a rotating member provided with minutely-crowned bearing surfaces, a non-rotating member provided with minutely-crowned bearing surfaces, said surfaces being disposed at angles to the axis of rotation, and substantially cylindrical rollers engaging said surfaces.

17. In a bearing, a plurality of minutely crowned rollers disposed crosswise to each other, said rollers engaging opposite minutely-crowned raceways.

18. In a bearing, rotating and non-rotating members provided with conoidal bearing surfaces, and rollers rotatable between said surfaces, said rollers and said surfaces having their contacting surfaces minutely crowned.

19. In a bearing, inner and outer conoidal bearing members having double-curved surfaces, rollers with crowned surfaces adapted to rotate between said bearing members, the said rollers being so arranged that the axes of some of them converge at a point on one side of the bearing and the axes of the others of them converge at a point on the other side of the bearing.

20. A bearing comprising two inner and two outer relatively rotatable bearing rings respectively having bearing surfaces substantially bounding an annular roller space quadrilateral in cross section, each of the said rings being freely separable from each of the others whereby the several rings can be assembled or disassembled in any desired sequence, and rollers arranged in the said roller space in a criss-cross manner, said rollers having bearing surfaces of substantially the same width as said first-mentioned bearing surfaces and normally in contact therewith substantially from edge to edge.

21. In a high speed roller bearing, inner and outer bearing members, rollers provided with domed ends adapted to rotate between said members, and a cage for maintaining said rollers in normal positions and for allowing sliding thereof into end contact with portions of said bearing members.

22. In a roller bearing, the combination of inner and outer conical bearing members, an annular series of rollers arranged in circumferential alinement, the axes of a number of said rollers converging at a point at one side of the bearing and the axes of the remaining rollers converging at a point at the opposite side of the bearing, and a cage for maintaining said rollers apart and permitting endwise contact with said bearing surfaces.

23. A bearing comprising rotatable and non-rotatable members each having two annular bearing surfaces at angles to each other, the four surfaces substantially bounding an annular roller space quadrilateral in cross section, rollers in the said space between each rotatable bearing surface and the opposite non-rotatable bearing surface, and a unitary cage having recesses in which all of the said rollers are respectively held with small working clearances.

24. In a bearing, inner and outer bearing members, rollers rotatable therebetween, and a cage for holding said rollers in definite positions with their axes approximately in but departing slightly from planes radial to the circumferential path of roller travel.

25. In a bearing, inner and outer bearing members, cylindroidal rollers rotatable therebetween, and a cage for holding said rollers in definite positions with their axes approximately in but departing slightly from planes radial to the circumferential path of roller travel.

26. In a bearing, inner and outer bearing members having bearing surfaces at acute angles to the axis of rotation, rollers rotatable therebetween, and a cage for holding said rollers in definite positions with their axes approximately in but departing slightly from planes radial to the circumferential path of roller travel.

27. In a bearing, inner and outer bearing members each having two bearing surfaces at angles to each other, rollers rotatable between said members and arranged in a criss-cross manner, and a cage for holding said rollers in definite positions with their axes approximately in but departing slightly from planes radial to the circumferential path of roller travel.

28. In a bearing, a rotating shaft, concentric rings associated therewith and provided with bearing surfaces at angles to said rotating shaft, rollers arranged in a criss-cross manner between said bearing surfaces and having their lengths substantially equal to their diameters, each of the said rollers rotating between two opposite bearing surfaces and adapted to contact at one end with one of the other two bearing surfaces, and a cage adapted to maintain said rollers in positions for overcoming centrifugal forces at normal speeds.

29. In a bearing, inner and outer bearing members, rollers rotatable therebetween, and a cage of cruciform cross section for receiving said rollers in positions tending to cause the same to move toward the axis of the said bearing members when rotating at less than normal speed.

30. In a bearing, inner and outer members provided with bearing surfaces, angularly-related rollers rotating between said surfaces, and a cage having compartments for receiving said rollers in circumferential alinement and having annular projections which move between said members.

31. In a bearing, inner and outer members provided with bearing surfaces, angularly-related rollers rotating between said surfaces, and a cage of cruciform section having apertures therein for receiving said rollers.

32. In a bearing, inner and outer members provided with conical bearing surfaces, rollers rotating between said surfaces, and a cage of cruciform cross section having apertures formed therein, some of said apertures leading from one recess of said cruciform cage and others from another recess.

33. In a bearing, inner and outer members provided with conical bearing surfaces, rollers for rotating between said surfaces, and a cage having external annular guiding projections and having roller compartments in circumferential alinement at 90 degress to each other.

34. In a bearing, inner and outer bearing members, rollers rotatable therebetween, and a cage having substantially cylindrical compartments into which said rollers may be inserted, said cage being recessed to permit said rollers to contact with said bearing members.

35. In a bearing, inner and outer bearing members, rollers rotatable therebetween, and a cage having compartments into each of which said rollers may be inserted from either end, said cage being recessed to permit said rollers to contact with said bearing members.

36. In a bearing, inner and outer bearing members, rollers rotatable therebetween and arranged in a criss-cross manner, and a cage having compartments into which said rollers may be inserted endwise, said cage being recessed to permit said rollers to contact with said bearing members.

37. In a bearing, inner and outer bearing members, rollers rotatable therebetween, and a cage of cruciform cross section having roller compartments, the said compartments extending entirely through from each recess of the said cruciform cage to the diagonally opposite recess.

38. In a bearing, inner and outer bearing members having double-curved surfaces, rollers with minutely crowned surfaces adapted to rotate between said members, and a rotating cage adapted to maintain each of said rollers in a position crosswise to the next adjacent roller.

39. In a bearing, members provided with inner and outer bearing surfaces, rollers rotatable therebetween, and interengaging axially-directed elements forming a pump means for maintaining a lubricant in said bearing and for preventing the introduction of foreign material therein.

40. In a bearing, members provided with inner and outer bearing surfaces, rollers rotatable therebetween, and interengaging axially-directed elements forming a pump means for maintaining a lubricant in said bearing and for preventing the introduction of foreign material therein, the pumping effect increasing with increase of speed of the bearing.

41. In a bearing, members provided with inner and outer bearing surfaces, rollers rotatable therebetween, and elements having interengaging axially-directed annular flanges forming a pump means for maintaining a lubricant in said bearing and for preventing the introduction of foreign material therein.

42. In a bearing, members provided with inner and outer bearing surfaces, rollers rotatable therebetween, and elements having interengaging axially-directed annular flanges for maintaining a lubricant in said bearing and for preventing the introduction of foreign material therein.

43. In a bearing, a plurality of inner and outer members provided with a plurality of double-curved conoidal bearing surfaces, a plurality of double-curved rollers rotating between said surfaces, a plurality of cages having compartments for receiving said rollers in a criss-cross manner, and a plurality of interengaging rings for protecting said bearing and for making it substantially non-leakable.

44. In a bearing, two or more sets of inner members, two or more sets of outer members, said members being provided with sets of double-curved conoidal bearing surfaces, a plurality of double-curved rollers rotating between said surfaces, a plurality of cages of cruciform cross section for receiving said rollers and for holding them separated, and a plurality of interengaging rings for protecting said bearing.

45. The combination of a truck frame, a wheeled axle, a bearing frame having horizontal trunnions perpendicular to the axle and pivotally engaging the truck frame, bearing means interposed between the axle and the bearing frame and comprising two separate roller bearings sustaining load at two points spaced apart along the axle, and rings provided with interengaging axially-directed flanges for protecting said bearing surfaces.

46. In a bearing, bearing members having beveled portions, a plurality of inner and outer rings respectively engaging the said beveled portions, an axle for receiving the said inner rings, an annular member for receiving the said outer rings, and tightening means for forcing said rings against said beveled surfaces on said bearing members for holding the latter together in working relationship.

47. In a bearing, an axle, bearing members surrounding said axle, inner rings for engaging said axle and said bearing members, outer rings for holding certain of said bearing members together, a common member to which said outer rings are secured, a nut associated with a screw thread on said axle for holding the said inner rings together, an oppositely threaded member associated with the end of said axle and locked therein, a nut associated with said oppositely threaded member, and a conoidal resilient metallic washer between the said nuts for holding the said first-named nut in position when said second-named nut is screwed into normal position, the said oppositely threaded member being expanded to retain said last-named nut in normal position.

48. In a bearing, bearing members, rollers for rotating therebetween, means for inclosing said members and rollers, a locking means for said inclosing means comprising a screw-threaded member in position against other screw-threads, a slot in one set of said screw threads, and a paste comprising an abrasive material occupying said slotted portion.

49. In a bearing, members provided with relatively movable bearing surfaces, and a plurality of rollers between said surfaces and contacting therewith only at the central parts of the roller surfaces when the bearing is free from load, the area of contact of said surfaces increasing in proportion to the increase of load, and extending throughout the length of said rollers under normal load.

50. In a bearing, members provided with relatively movable bearing surfaces, and a plurality of rollers between said surfaces, said surfaces and rollers being so shaped that the area of contact of each roller with said surfaces is proportional to the load upon the bearing and the pressure therebetween at any point is inversely proportional to the distance from the center of the roller, said rollers contacting with said surfaces throughout their width at normal load.

51. In a bearing, a rotating shaft, two relatively rotatable members associated with said shaft and each provided with two annular bearing surfaces at angles to each other and oblique to said shaft, the four surfaces substantially bounding an annular roller space quadrilateral in cross-section, substantially cylindrical rollers in said space contacting with two opposite bearing surfaces, and substantially cylindrical rollers in said space contacting with the other two opposite bearing surfaces, each roller of each set having a length approximating but not exceeding the diameter of the rollers of the other set.

52. In a bearing, a rotating shaft, two relatively rotatable members associated with said shaft and each provided with two annular bearing surfaces at right angles to each other and oblique to said shaft, the four surfaces substantially bounding an annular roller space rectangular in cross-section, and substantially cylindrical rollers in said space arranged in a criss-cross manner and circumferentially alined, said rollers being of substantially equal length and diameter, and each roller having rolling contact with opposed bearing surfaces.

53. In a bearing, the combination of a rotating member provided with a minutely-crowned bearing surface, a non-rotating member provided with a minutely-crowned bearing surface, and minutely-crowned rollers engaging said surfaces.

54. In a bearing, rotating and non-rotating members provided with opposed bearing surfaces and minutely-crowned rollers engaging said surfaces, the extent of crowning being so related to the elasticity of the rollers that the distortion under normal load causes the rollers to contact substantially from edge to edge with said bearing surfaces.

55. In a bearing, rotatable and non-rotatable members provided with two pairs of opposed bearing surfaces, and minutely-crowned rollers arranged in a criss-cross manner in circumferential alinement and each engaging a pair of opposed bearing surfaces, the extent of crowning being so related to the elasticity of the rollers that the distortion under normal load causes the rollers to contact substantially from edge to edge with the bearing surfaces.

56. In a bearing, rotatable and non-rotatable members provided with two pairs of opposed minutely-crowned bearing surfaces, and minutely-crowned rollers arranged in a criss-cross manner in circumferential alinement and each engaging a pair of opposed bearing surfaces, the extent of crowning being so related to the elasticity of the members and rollers that the distortion under normal load causes the rollers to contact substantially from edge to edge with the bearing surfaces.

57. A cage for the rollers of a roller bearing comprising a ring provided with compartments angularly disposed with respect to each other and into each of which the rollers may be inserted from either end.

58. A cage for the rollers of a roller bearing comprising a ring of cruciform cross-section provided with compartments into which the rollers may be inserted endwise.

59. A cage for the rollers of a roller bearing comprising a ring of cruciform cross-section provided with diagonal compartments for the rollers, said compartments opening laterally into opposed diagonal recesses of the ring.

60. A cage for the rollers of a roller bearing comprising a ring of cruciform cross-section provided with diagonal compartments for the rollers, said compartments being alternately disposed in angular relation and opening laterally into opposed diagonal recesses of the ring.

61. In a bearing, an axle, bearing members associated therewith, rollers between said bearing members, and means for maintaining said bearing members and rollers in operative relationship with said axle comprising a nut engaging screw-threads on said axle, an oppositely screw threaded member fast with the end of the axle and carrying a second nut, and a conoidal resilient washer between the said nuts for locking said first-named nut in position.

62. A bearing comprising two inner and two outer relatively rotatable bearing rings respectively having minutely crowned bearing surfaces oblique to the axis of said rings and substantially bounding an annular roller space rectangular in cross-section, each of the said rings being freely separable from each of the others whereby the several rings can be assembled or disassembled in any desired sequence, and minutely-crowned rollers in said roller space.

63. A bearing comprising two inner and two outer relatively rotatable bearing rings respectively having bearing surfaces substantially bounding an annular roller space quadrilateral in cross-section, each of the said rings being freely separable from each of the others whereby the several rings can be assembled or disassembled in any desired sequence, a cage cruciform in cross-section and having its respective arms guided between adjacent rings, and rollers in said space maintained in normal positions by said cage.

64. A bearing roller having its rolling surface minutely crowned to cause the edge portions thereof when free from load to be out of contact with the race surfaces with which the central portion contacts, the extent of crowning being so related to the elasticity of the roller that the distortion under normal load causes the roller surface to contact substantially from edge to edge with the race surfaces, said roller having end surfaces shaped to permit spinning of the roller thereon.

65. A bearing roller having a minutely-crowned rolling surface, the extent of crowning admitting of contact of said rolling surface throughout its length with a race surface when there is a predetermined load upon the bearing.

66. A bearing roller having a minutely-crowned rolling surface and domed ends, the extent of crowning admitting of contact of said rolling surface throughout its length with a race surface when there is a predetermined load upon the bearing.

In testimony whereof I have signed this specification in the presence of two subscribing witnesses.

BENJAMIN DENVER COPPAGE.

Witnesses:
  H. J. FEENEY,
  GEO. E. SANDS.